US006299765B1

United States Patent
Fabrizio

(12) United States Patent
(10) Patent No.: US 6,299,765 B1
(45) Date of Patent: Oct. 9, 2001

(54) SURFACE FEED FILTER PUMP BOX FOR AQUARIUMS

(76) Inventor: Robert A. Fabrizio, 42 Stevens St., Norwalk, CT (US) 06850

( * ) Notice: Subject to any disclaimer, the term of this patent is extended or adjusted under 35 U.S.C. 154(b) by 0 days.

(21) Appl. No.: 09/314,395

(22) Filed: May 19, 1999

(51) Int. Cl.[7] .................................................. A01K 63/04
(52) U.S. Cl. ...................... 210/169; 210/242.1; 210/282; 210/416.2; 210/905; 119/259
(58) Field of Search .................................... 210/121, 169, 210/242.1, 264, 282, 416.2, 905; 119/226, 227, 259–262

(56) References Cited

U.S. PATENT DOCUMENTS 2,579,304 * 12/1951 Crawford .
3,785,493 * 1/1974 Harding .
3,983,843 * 10/1976 Johnson .
5,160,622 * 11/1992 Gunderson et al. .
5,282,961 * 2/1994 Ellis et al. .
5,282,962 * 2/1994 Chen .

* cited by examiner

Primary Examiner—David A. Simmons
Assistant Examiner—Fred Prince
(74) Attorney, Agent, or Firm—Michael J. Cronin

(57) ABSTRACT

An improved surface feed filter pump box for aquarium is provided which feeds water from the surface for filtration. The box performs this filtration inside the aquarium. Since the device does not hang on the outside of the tank there is no leaking or overflowing operation is quiet. Water circulation helps bring more nutrition to live plant and fish life and prevents waste from collecting at the bottom of the aquarium. It also helps prevent excessive overflow and the motor used from running dry. The invention in addition makes changing filters easy and convenient.

7 Claims, 4 Drawing Sheets

EXTERNAL HANG ON POWER FILTER

SURFACE FEED FILTER PUMP BOX FOR AQUARIUMS

FIELD OF THE INVENTION

The present invention relates to the filtration of aquariums particularly those using salt water. The invention specifically relates to a novel surface feed filter pump box for filtering the water in aquariums and more specifically involves an in-tank hang-on filter system.

BACKGROUND OF THE INVENTION

The hobby of fish collecting is one of the fastest joining recreational activities in the United States and Canada with increasing numbers of relatively affluent people joining each year. The enjoyment of salt water fish, with their exotic coloring and shapes, particularly appeals to both men and women.

In fish aquaria used by professional fish breeders and pure hobbyists, it is desired to establish and maintain an environment that is not only habitable for the fish, but is as close as to the native environment in which the fish would live in nature. This is particularly important for salt water fish, many are from relatively pristine environments and most particularly important for the breeding of fish. Even a small amount of environmental stress, including water temperature and contamination, will prevent successful breeding for many species.

While an aquarium soon after being set up and filled with salt water and biological chemicals usually has a suitable environment, if the water is carefully prepared and properly tested, organic wastes, such as left-over food, fecal and other fish-like excretions, and decaying play/animal materials, are introduced over time into every aquarium. These wastes then break down through microbe action. Many of these decaying products create chemical imbalances and become harmful, particularly to certain exotic fish and live rock species that are common and/or popular among salt water aquarium owners. Waste is also unsightly and detracts from the fish viewing experience by an increased rate of algae growth. If the waste is not removed or transformed into a less toxic substance, an aquarium environment quickly degrades as the concentration of contamination climbs until it will either no longer support fish life or does so only in a very degraded or unsightly state.

In the past, fish collectors solved the waste build-up problem by replacing a significant portion of the aquarium water at frequent regular intervals, a laborious time consuming practice impractical for most hobbyists who have other business and jobs. Accordingly, today aquarium water is most often circulated through purifiers or filters, which remove the waste from the water which is then recirculated back into the aquarium system. The term "filter", as used in the field encompasses any device that removes undesirable substances from the aquarium or pond water, whether dissolved organic substances, solid, semi-solid or non-solid particulates, or inorganic contamination.

There are many types of filters available in the consumer market that operate on the basic principle of circulating water from the aquarium through the filter medium, either mechanical or biological, and then pumping the cleansed water back into the aquarium. The medium in these filters is usually a medium for removing solid particles, e.g. floss, or a substance, such as activated carbon, that removes non-solid substances such as dissolved gasses and chlorine, or biological filtration which breaks down waste by a natural biological breakdown process of running the water through biological collecting surfaces. A popular filter material used in mechanical filtration is activated carbon or charcoal, which acts, in particular, to remove both undissolved matter and dissolved matter right from the start. Fine granulated so-called gas grade charcoal has an adsorptive surface on which chemicals of all descriptions may be adsorbed.

In filtering water in a fish tank, it is best to skim the water from the surface of the tank. Most waste and debris found in a fish system are protein based and float to the top of the tank with air bubbles, especially if air or water circulation pumps are used in the tank. In common practice the filter is basically a device designed to hang onto the top edge on the side of the fish tank with a part of the device inside the tank. The filter system sucks in water from the tank taking in water that contains the most dirt and protein. At the same time the filter system's output is pumped out back into the aquarium. Various filter media such as cotton and carbon or a filter cartridge can be put into the box to achieve very effective mechanical filtration of the water that flows through it. Ordinary coarse filter material such as synthetic filter floss pads of various types can cope with the above if the filter is frequently replaced and cleaned.

For more complete background, the main toxic material produced by the breakdown of excreta, uneaten food, etc., is ammonia. This is converted to nitrates by bacteria, then by further bacterial action, the nitrites are converted to nitrates. Both ammonia and nitrites are harmful to fish, even in minute amounts (250 to 300 parts per million), and can be monitored by suitable test kits. However, if bacteria growth is not present, and filtering not efficient, decomposition of uneaten food and algae produces toxic substances which may kill the fish, coral and live rock.

The most popular commercial fish filter used for both salt and fresh water primarily fresh water aquariums is commonly called a hang-on power filter (see FIG. 2 discussed hereafter for a typical configuration). This type of filter hangs on the top edge of the side of the outside of the back of the tank (somewhat hidden from view). The U-shaped hose, often called a siphon water intake tube, siphons water into the hanging filter container, the electric pump at the bottom of the container keeps this flow going. The water then overflows from the container back into the primary tank. As the water flows out of the output, it passes through filter media contained in the container. These types of filter devices are not suitable for larger fishtanks because they perform only mechanical filtration (no biological function), they do not filter the surface water and are not able to be connected to feed other filtration devices.

This container in most aquariums is a box which is positioned largely outside the aquarium. The device is positioned on the back wall of the aquarium where it cannot be directly seen by an observer. The box itself is usually made of plastic, often transparent or semi-transparent. A portion of the box contains filter material, wool, charcoal or mixture thereof.

Another form of filtration device which is often used in conjunction with the above mentioned salt water systems is called a protein skimmer. Organic waste material formed by aquatic life waste, uneaten food and dead plant tissue is in the fish tank field designated as "protein." In general protein skimmers use air bubbles through a passage column containing aquarium water. Bubbles by surface action carry the protein to the top of the skimmer apparatus where they are periodically removed by "skimming" or overflowing into a reservoir cup of the surface water. Most protein skimmers are costly and complicated and can require frequent adjustment of air and waterflow and emptying of the reservoir cup to prevent overflowing and optimize performance as chemical changes occur in the water from day to day.

Several companies have designed new types of protein skimmers that now hang on the side of the tank. These hang-on designs are intended to eliminate the need of an external filtering tank. The biggest worry and potential problem with a hang-on skimmer is the fact that subtle changes in the chemical make up in the water (such as temperature changes, over feeding or the addition of chemicals) can cause the bubble and dirt collector cup to start to overflow in many cases, all over the floor surrounding the aquarium. With one method currently available for feeding waterflow to this type of skimmer a powerhead pump is submersed well below the surface of the water level of the tank, its failure can result with the owner waking up, or coming home, to find half or more of the tank's water overflowed onto the floor.

As shown in the description above and as discussed hereafter, the most common power filters usually hang outside the top of the aquarium tank. These types of filters are started by filling the external box with water, then the siphon tube is started manually by detaching it and submersing it, holding one's finger over the ends to retain the water, then quickly attaching it back in place. The electric pump is then turned on to start and keep the flow going. A siphon tube conveys water into the filter using a pump inside the filter box to keep the flow going. In such filters, the tube is primed with water by submersing and holding one's thumb over the end and filling the box with water. The water is drawn into a tube by a circulation pump in the box and returns to the tank, while one or more siphon tubes convey water from the tank to the filter, where it passes through the filter bed (or beds) and then is conveyed back into the tank.

While there are numerous patents in the field, see for example recent U.S. Pat. Nos. 5,618,428 and 5,628,905, the most common prior commercial art is summarized below in the discussion of the Drawings.

Figure 1:
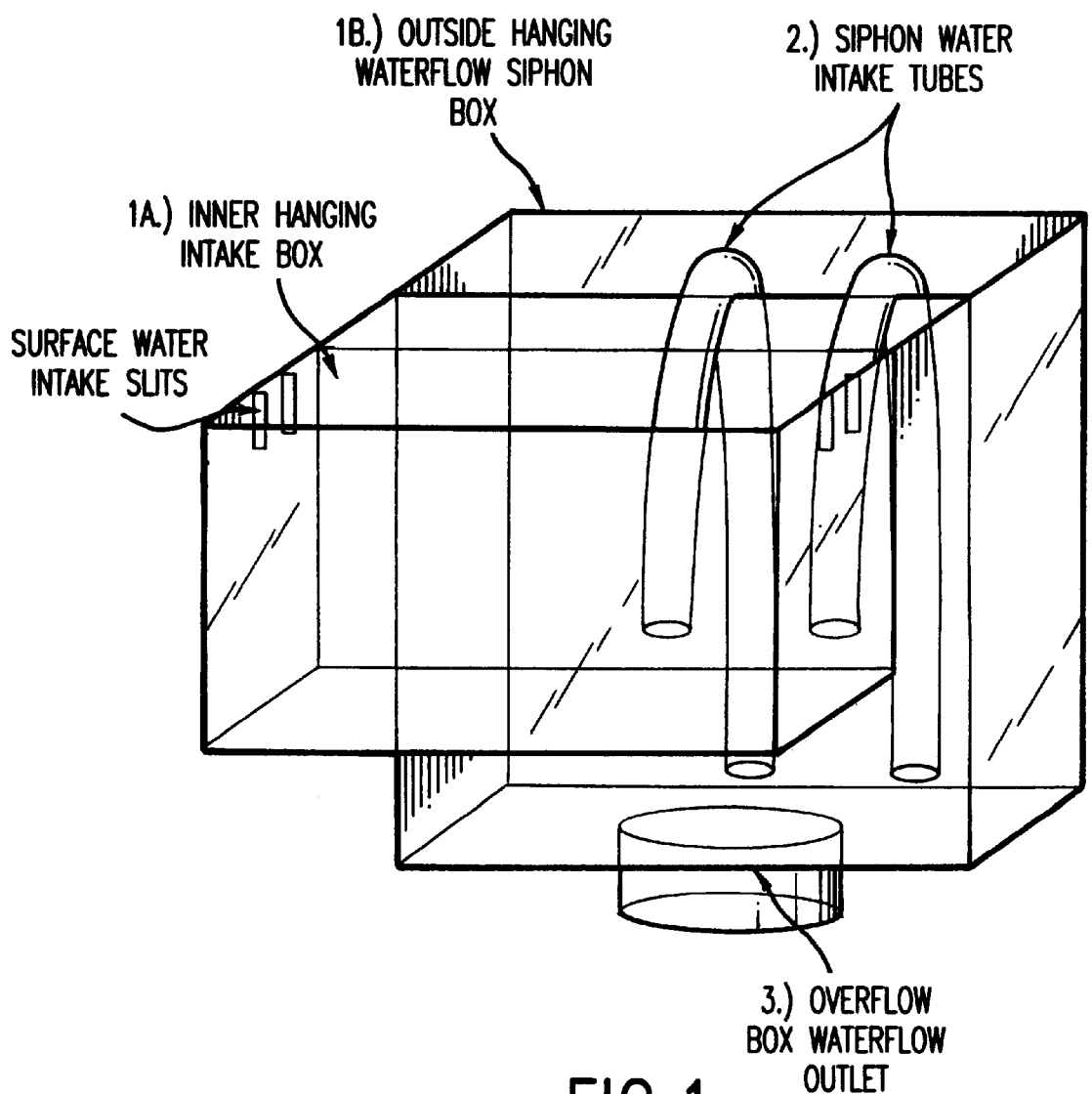
FIGS. 1 and 2 of the drawings shows current commercially available products which are in the prior art.

Shown in FIG. 1 is a device used to feed water flow to what is most often called an external "wet dry" filter system. A typical design of this overflow box consists of two boxes (1) attached together that hang over the top edge of the side of the tank. One box (1A) hangs on the inside of the tank at the water surface level and the other (1B) hangs directly opposite it on the outside of the tank. A "U" shaped siphon tube or tubes (2) is then used to siphon the water from the inner box to the outer box. The bottom of the outer box has a large 1" (or more) diameter drain hose (3) which transfers the surface water from the primary fish tank down to the separate filter holding tank which has s series of various filtration devices in it. It's output requires a high flow return pump which pumps the water back to the primary fish tank.

Disadvantages of this device are apparent. The U-shaped hoses are very difficult to start siphoning and they need to be checked frequently for the possibility of the siphoning stopping (especially as the water level and flow into the box slows). Siphoning can easily stop without outside interference due to various factors such as: the end of the hose bottoming out on the bottom of the box, a power outage or insufficient return water flow. An additional drawback of this design is that it does not allow for the ability to use any kind of pre-filtering media for the water flowing through the two boxes.

In addition, there are other now-obvious drawbacks due to the excessive size and maintenance of the extra external "wet dry" filtering tank, the risk of leaks, and the risk of the electric return pump running dry; the biggest common danger is from electric pumps. In addition to the required return flow pump, there are usually in commercial devices at least one or more other various filtration pumps contained within the external filtration tank. These types of electric pumps very easily burn up if they run dry. Such pumps easily run dry if the overflow box goes empty; this often occurs if the water level in the primary fishtank levels down due to evaporation or spillage.

Figure 2:
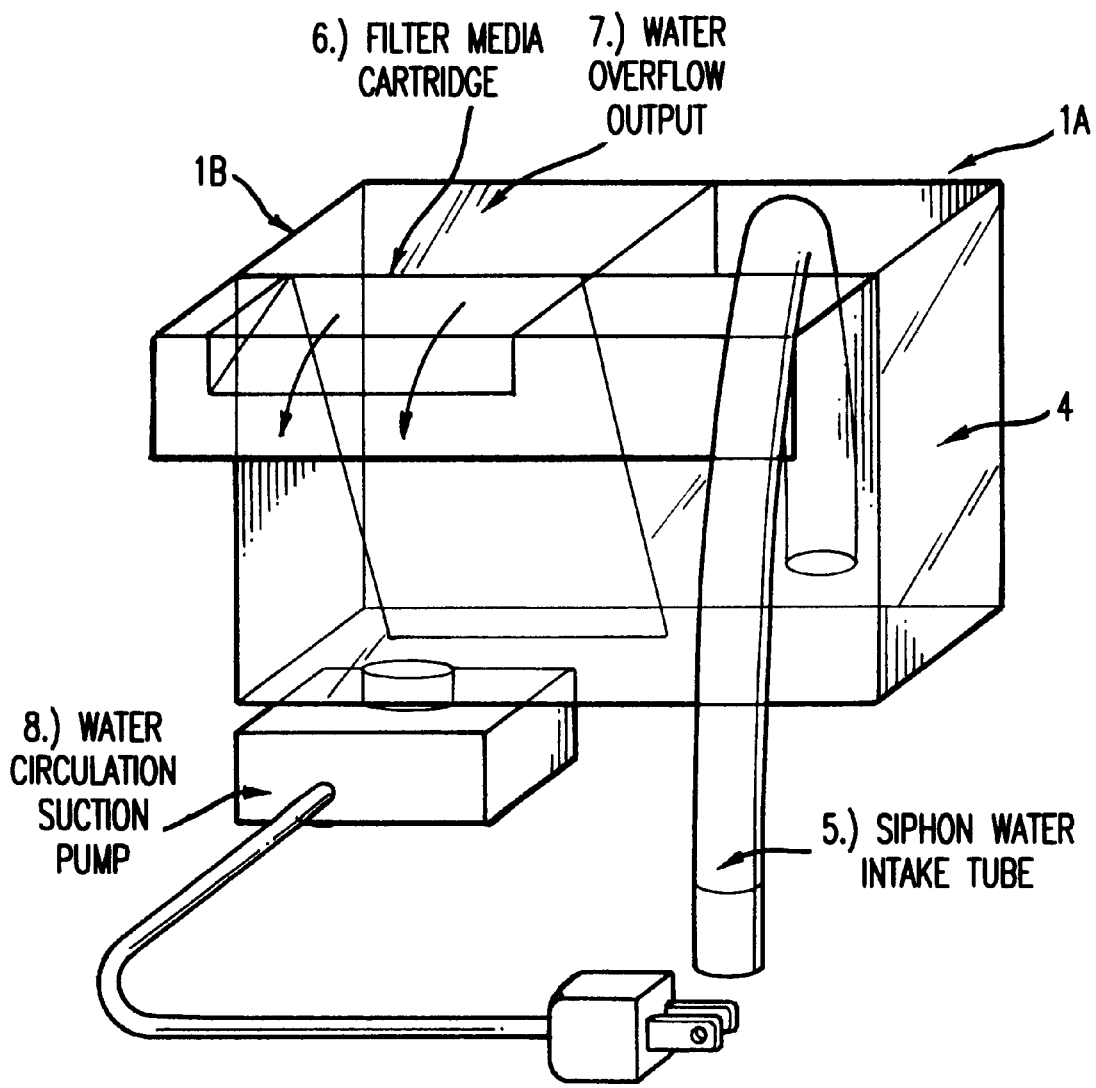

Another commercial prior art device is shown in FIG. 2 and is most often designated an external hang-on power filter. These type devices have a filter box (4) that hangs on the top edge of the side and outside of the tank. The U-shaped hose (5) siphons water into the hanging filter box and the water then passes through filter media (6). The water then overflows from the box at (7) back into the primary tank; the pump (8) in the box keeps this flow going.

These types of filter devices are not suitable for larger fishtanks since they are generally low powered and do not move enough volume of water through them fast enough. They also do not filter the surface water and do not have the ability to be connected to feed other filtration devices.

Figure 3:
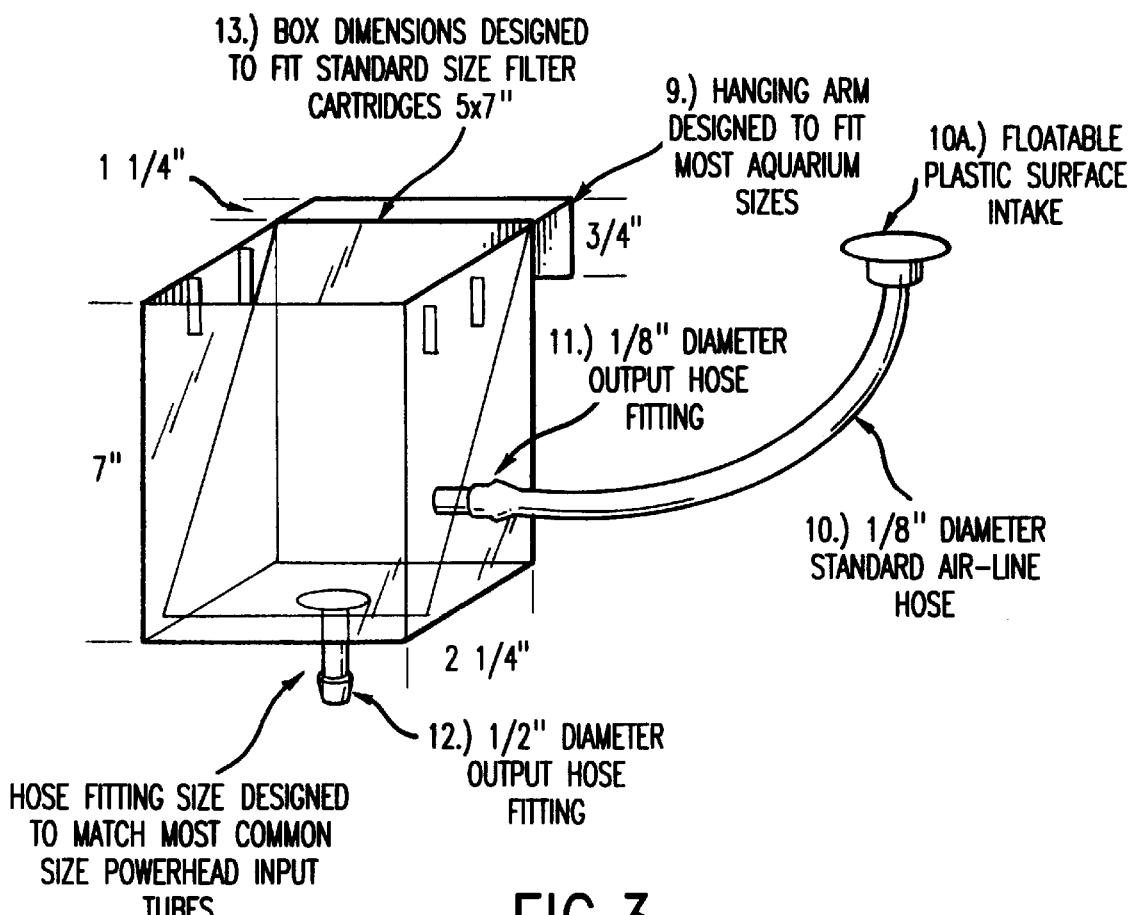

FIG. 3 shows one aspect of the invention. For simplification purposes a suggested size is based on the most commonly available filter cartridges which are most commonly used in most styles of external hang-on power filter devices.

Reviewing FIG. 3, an embodiment of the invention is hung on the side of the tank by it's hanging arm (9) with it's box area hanging inside of the tank. A short length of standard plastic or silicone airline hose (10) is attached by slipping it onto a connecting fitting (11) terminating in a floatable plastic surface intake (10A).

The hose can be cut to a length that allows it to reach the surface of the water level of the tank. The floatable plastic intake fitting is then slipped into the other end of this hose to help it more effectively take in water. This floating surface intake is optional since airline-tubing floats on it's own. Next, a standard powerhead pump (FIG. 4) is attached to the bottom output hose fitting (12) on the invention to the intake hose fitting of the powerhead pump, usually by way of a rubber or plastic hose of the same inner diameter to attach the two together. Finally, a standard filter cartridge is slid in on an angle to diagonally cover the output hole at the bottom to the top surface as shown (11). This will insure that all water passing thru the box will travel through the filter media. Grooves can be molded in the inner sides of the box to hold the filter more securely. Or, the box can be alternatively filled with bio-balls or other filter media. When the powerhead pump is turned "ON" the dirty water from the surface of the tank is sucked through the slits at the top of the box, through the filter media and clean water goes out through the pump.

The invention can easily and very effectively be used as described for most fresh water applications as the only form of filtration. This is achieved simply by attaching a powerhead to it's bottom output and allowing the output of the pump to simply pump through the tank which also provides added water circulation which also helps keep the tank clean.

In a saltwater tank where usually more than one type of filtration process is desired, the invention can be used as a stand-alone system, or more advantageously as a feeding system for other biological or mechanical filtration devices. Feeding other filtration devices is achieved by attaching the output of this system to a supply hose as an input to the other device or devices.

Figure 4:
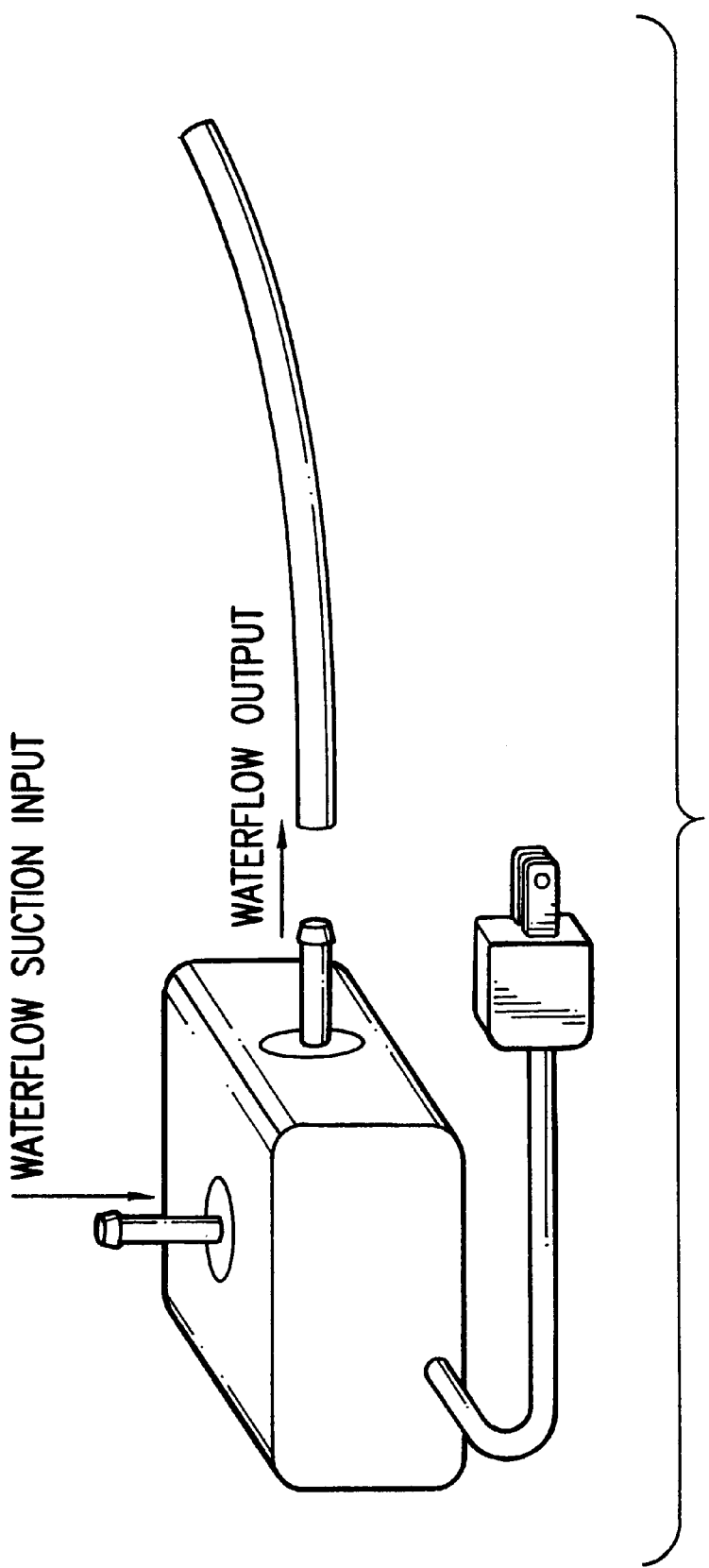

FIG. 4 shows an optional aspect of the invention using a powerhead pump. The device is designed with a hose fitting at the bottom of the box to allow for attachment of the input of a standard powerhead by using a simple hose or threaded fitting attachment. A powerhead is a common type of submersible electric water pump sold for fish aquariums usually with a round (½" or so diameter) hose fittings at its input and output. Powerheads are commonly used to circulate water around the inside of the tank or to pump water into or out of a filtering device. When this type of pump is attached to the invention, water enters through the longitudal slits shown and then through the box containing filter media, and then out the bottom of the box through the attached pump.

SUMMARY AND OBJECT OF THE INVENTION

The present invention overcomes the problems and disadvantages of the prior art by providing a surface feed filter pump box for use in aquariums which substantially reduces the likelihood that the water feeding box will ever run dry.

A further object of the invention is that it reduces the likelihood of pump burn-out for lack of water.

Another object of the invention is to prevent overflow which will damage the outside environment and could cause death to the aquatic creatures using the aquarium.

DESCRIPTION OF THE PREFERRED EMBODIMENTS

A fish tank system including saltwater systems consists of both biological filtration devices and mechanical filtration devices. As described above, biological filtration usually takes the form of a combination of a wetdry system with a protein skimmer inside of it. Other biological devices include fluidized bed filters which pump water through a chamber filled with tiny glass beads which grow bacteria on them which biologically breaks down waste, and ultraviolet light sterilization filters. Mechanical filtration devices use media such as: carbon, cotton fiber material, chemical reactions, and the like to mechanically filter the water flowing through them. All of these devices and many others not mentioned all use some for of pumping system to force dirty water through them and then back into the tank. The invention herein can effectively be used to improve the performance of all of these systems.

In filtering water in a fish tank, the invention hereof is based on in part on the finding that is more effective to skim the water from the surface of the tank for filter treatments. Most waste made up of proteins and debris floats to the top, especially if air and air bubbles or water circulation pumps are used in the tank. For even more effectiveness an air stone can be placed in the tank just below the box to allow for more waste to float to the surface and get sucked into the box.

The invention in one embodiment is a box or box-like structure which can be made of translucent plastic much like that used in present day power filter boxes designed to hang onto the top on the side of a fish tank with its filter box inside the fish tank. The hang-on structure can be a wide variety of attachment mechanisms well known in the art. The box can be made of any material with plastic being preferred. The box by the use of a series of surface openings in one or more of its faces draws surface water from the tank (the device can also be used for a pond) thereby taking in surface water that contains the most dirt and protein. Various well known filter media such as cotton and carbon or a filter cartridge are put into the box to achieve very effective mechanical filtration of the water that flows through it. After the water enters the box and passes through the filter media it is pumped out below the surface of the water from either the bottom of the tank or low on one or more of the tank walls and used to help provide water circulation in the lower part of the tank.

Unlike typical commercial designs discussed previously, there are no siphon hoses to maintain or to have difficulty starting (or stopping on their own as water levels decrease), the box automatically feeds on water from the surface of the aquarium. Importantly the box does not hang on the outside of the tank and consequently there is no worry about it leaking or overflowing. The operation is very quiet since the water and aquarium tank walls muffle the sound of the filter. In addition, the device adds water circulation by use of its pump output. Water circulation helps move nutrition around to live plants and rock life and helps prevent waste from collecting or settling at the bottom of the tank. The device is designed with a hose fitting at the bottom of the box to allow for attachment of the input of a standard powerhead by using a simple hose or threaded fitting attachment. A powerhead is a common type of usually submersible electric water pump sold for sign aquariums usually with a round (½" or so diameter) hose fittings at it's input and output. Powerheads are commonly used to circulate water around the inside of the tank or to pump water into or out of a filtering device.

When this type of pump is attached to the invention and turned on water is sucked from the surface of the water in the tank entering through the slits in the box's sides shown and then through the box containing filter media, out of the bottom of the box through the pump attached. In an alternative embodiment, the pump can be incorporated into the box itself. The pump can also be attached to the outside of the aquarium or on the filtration device.

In a further aspect, the invention includes use of a protein skimmer. This aspect of the invention uses the filter feeding device output, by attaching the output of the attached powerhead pump to a feed hose or similar device and attaching the other end of that hose to the input of a second filter device such as a protein skimmer. Protein skimmers are usually set up in a separate external "wet dry" filtering tank. Protein skimmers require a powerhead pump to pump the water through them. Because of the invention's design the skimmer cannot overflow or spill out more of the tank's water than from the level of slits on the box. The invention is very well suited for a "Hang On" (or external) protein skimmer because with its design, the skimmer could never overflow or spill out more water from the tank than the level of the slits on the filter pump box. In addition, since the box feeds from the surface of the water in the tank, the attached powerhead pump also will never run dry when used with the inventive method because of the fact that as the water level of the tank gets low, water still flows into the box slowly (either through the surface slits or through the floating surface safety hose). The filter box also can not run empty because as soon as the water flow through the box slows (by a decreased water level) the water then also flows out of the skimmer slowly, which keeps the water going at a speed which keeps the pump continuously wet long enough until the water level is noticed and corrected. The reduced rate of flow automatically keeps the skimmer flowing at a speed which makes it impossible to continue the overflow.

The invention provides the added advantage of being able to better pre-filter the water being pumped to the skimmer or other filtration devices, and being able to add to more types of filter media (such as cotton and carbon), it also makes it much easier to replace the filter media more often. This is because the pre-filter media is in the box which is near the top of the water surface instead of deep in the tank inside of the pump. This feature makes if more effective and much easier to replace more often than prior devices.

Use with a standard protein skimmer is also easy to accomplish. Prior art non-hang-on skimmers, requires the skimmer to be operated inside of an external "wet dry" filter tank system. The typical filter box in a "wet dry" system uses a siphon system to drain the primary tank water from an overflow box, and then having a powerhead pump attached inside the external filter tank to circulate the water thru a protein skimmer and filter media and then another pump to pump the filter tank water back up to the primary fish tank in an alternative embodiment. Use of the invention in this type of set-up makes it unlikely for the water feeding box to ever run dry and burn out the pumps. With a typical overflow siphon type box described there is either full-flow or no flow at all. The above described invention allows for slow flow even if the water gets down low on the intake slits, in contradiction, an overflow box will run empty and stop, which will cause the pumps to then run dry and often burn out when the power comes back on.

While the present invention has been described with reference to particular embodiments thereof, it will be understood that numerous modifications can be made with those skilled in the art without actually departing from the scope of the invention. Accordingly, all modifications and equivalents may be restored which fall within the scope of the invention as claimed.

I claim:

1. A surface feed filter box for fresh and salt water aquariums comprising:
   a) a filter pump box designed to hang inside the aquarium where the top of such box is at about the surface level of the water in the aquarium when in position in the aquarium;
   b) a flotable surface intake for intake of water from the aquarium;
   c) a replaceable filter medium mounted inside such box; and
   d) an output hose connection permitting connection of the box to a pump to return filtered water to the aquarium or to feed other filtration devices.

2. The filter box of claim 1 wherein one to four sides of the box have one or more longitudinal slits positioned at the top of such box.

3. The filter box of claim 1 wherein the filter medium is at a diagonal angle to the filter box.

4. The filter box of claim 1 wherein the output hose connection is an opening in the bottom of the box permitting attachment of an output hose fitting from a powerhead pump.

5. The filter box of claim 1 also containing a connection for a protein skimmer.

6. The filter box of claim 5 wherein a protein skimmer is attached to the box and one to three sides of the box have one or more longitudal slits positioned at the top half of the box.

7. A surface feed filter box for aquariums comprising:
   a) a filter pump box designed to hang inside the aquarium where the top of such box is at about the surface level of the water in the aquarium when in position in the aquarium;
   b) a flotable surface intake for intake of water from the aquarium;
   c) a replaceable filter medium mounted inside such box; and
   d) a pump which returns filtered water to the aquarium with an output connection to the aquarium.

* * * * *